United States Patent
Bronold et al.

(10) Patent No.: US 6,815,114 B1
(45) Date of Patent: Nov. 9, 2004

(54) MEMBRANE ELECTRODE UNIT FOR FUEL CELLS AND THE LIKE

(75) Inventors: Matthias Bronold, Berlin (DE); Henrik Colell, Berlin (DE); Christian Leu, Berlin (DE)

(73) Assignee: Heliocentris Energiesysteme GmbH, Berlin (DE)

( * ) Notice: Subject to any disclaimer, the term of this patent is extended or adjusted under 35 U.S.C. 154(b) by 0 days.

(21) Appl. No.: 09/979,996
(22) PCT Filed: May 25, 2000
(86) PCT No.: PCT/DE00/01742
§ 371 (c)(1), (2), (4) Date: Mar. 27, 2002
(87) PCT Pub. No.: WO00/74160
PCT Pub. Date: Dec. 7, 2000

(30) Foreign Application Priority Data

May 28, 1999 (DE) ................................. 199 26 026

(51) Int. Cl.⁷ ................................................ H01M 2/08
(52) U.S. Cl. ................... 429/35; 429/36; 429/34; 429/32; 428/192; 428/200
(58) Field of Search .......................... 429/34, 35, 36, 429/32; 428/192, 200

(56) References Cited

U.S. PATENT DOCUMENTS 5,187,025 A 2/1993 Kelland et al.
6,054,228 A * 4/2000 Cisar et al. ................. 429/18
6,080,503 A 6/2000 Schmid et al.
6,756,147 B1 * 6/2004 Bronold et al. ............. 429/35

FOREIGN PATENT DOCUMENTS

| EP | 0 339 114 A1 | 11/1989 |
|----|----|----|
| EP | 0 690 519 A1 | 1/1996 |
| JP | 05 174845 | 7/1993 |
| JP | 08 148169 | 6/1996 |
| JP | 09 289028 | 11/1997 |
| JP | 10 189018 | 7/1998 |

* cited by examiner

*Primary Examiner*—Bruce F. Bell
(74) *Attorney, Agent, or Firm*—Webb, Ziesenheim Logsdon Orkin & Hanson, P.C.

(57) ABSTRACT

The invention relates to a membrane electrode unit for fuel cells. The inventive membrane electrode unit comprises a reinforcing frame that is situated on the periphery and in the area of openings which are placed in the active portion of the membrane electrode unit and provided for guiding material or for installation. Said reinforcing frame is formed by a hot-melt-type adhesive layer that is applied on both sides and is formed by at least one rigid plate. The hot-melt-type adhesive layers which protrude over the outer edge of the membrane electrode unit enter into an intimate bond, due to the effect of pressure and heat, with the rigid plates and with the membrane electrode unit as well as with one another in the projecting area. The hot-melt-type adhesive comprises ionic or strong polar groups which interact with the ionic groups of the polymer electrolyte membrane and which ensure a high degree of adherence between the hot-melt-type adhesive and the membrane electrode unit.

9 Claims, 2 Drawing Sheets

MEMBRANE ELECTRODE UNIT FOR FUEL CELLS AND THE LIKE

BACKGROUND OF THE INVENTION

1. Field of the Invention

This invention relates to a membrane electrode unit for fuel cells, membrane electrolysis units and membrane compressors, which consists of a polymer electrolyte membrane and electrodes covering the latter on both sides, as well as a reinforcing frame attached to the periphery of the membrane electrode unit.

2. Description of the Prior Art

In similar membrane electrode units of the prior art, the electrodes have a porous catalyst layer attached to a backing material and are covered with gas distributors and current leads and have a frame-like reinforcement to facilitate handling and installation. The reinforcement of the individual units makes installation significantly easier, especially when there are a plurality of membrane electrode units arranged in series in a fuel cell unit that have installation borings and openings for the passage of the coolant and reaction medium, as well as corresponding seals in this inactive area.

On a similar membrane electrode unit of the prior art that is described in U.S. Pat. No. 5,187,025, the reinforcing frame is formed by two electrode frames that are in tight contact with the electrodes, between which electrode frames, extending into the membrane electrode unit in the form of a frame bridge, there are plastic layers and a plastic membrane layer (membrane frame) which also extends into the membrane electrode unit, whereby the connection between the electrode frames and the frame bridge or the frame bridges and/or between the membrane frame and the polymer electrolyte membrane is created by means of a thin acrylic adhesive layer. However, on account of its reinforcement, this membrane electrode unit, which is advantageous for the manufacturing of fuel cells on account of its reinforcement, has the disadvantage that it is also difficult and expensive to manufacture on account of the many individual parts, and in any case the handling of adhesives in the manufacturing process presents problems of its own, because the surface energy of the polymer used as the backing material is low, and it is therefore difficult to achieve good adherence.

The object of the invention is therefore to create a membrane electrode unit of the type described above which can be manufactured easily and economically and guarantees a secure seal of the electrochemical cell.

BRIEF SUMMARY OF THE INVENTION

The invention teaches that this object can be achieved with a membrane electrode unit that consists of a polymer electrolyte membrane and electrodes that cover it on both sides, as well as a reinforcing frame that is attached to the periphery of the membrane electrode unit, wherein the reinforcing frame is formed by a hot-melt-type adhesive layer that is deposited on both sides in the outer peripheral area and in the peripheral area of openings that are provided for installation and/or to guide media and a rigid plate which is attached to the hot-melt-type adhesive layer on one or both sides, whereby the hot-melt-type adhesive layers can be connected by the action of pressure and heat with the rigid plate(s) and the membrane electrode unit into a one-piece reinforcing segment in the peripheral area in question.

The hot-melt-type adhesive layers, which on the outer peripheral reinforcement preferably extend beyond the outside edge of the membrane electrode unit, are pressed against the rigid plate and the membrane electrode unit, thereby compensating for any irregularities and differences in thickness, penetrate deep into any cavities that may be present and thereby enter into an intimate connection with each other and with the membrane electrode unit and the rigid plate(s) in the projecting area. Therefore, with only a few components, a homogeneous and inherently stable reinforcement segment is created which can be manufactured easily, guarantees easy handling of the membrane electrode unit and provides a secure seal of the electrochemical cell in the outer peripheral area as well as in the vicinity of openings to guide media.

Additional characteristics and advantageous developments of the invention are described in greater detail in the dependent claims and in the following description of one preferred exemplary embodiment of the invention.

For example, one important feature of the invention is that the hot-melt-type adhesive layers extend by approximately one-half of their width beyond the outer edge of the membrane electrode unit, so that the hot-melt-type adhesive layers can be melted directly together in this area, thereby reducing the amount of material required for the membrane electrode unit, of which only a narrow edge is covered.

The invention also teaches that a hot-melt-type adhesive with ionic or strong polar groups is used which enter into an intimate interaction with the ionic groups of the polymer electrolyte membrane and therefore guarantee a good adherence of the hot-melt-type adhesive to the membrane.

BRIEF DESCRIPTION OF THE DRAWINGS

One exemplary embodiment of the invention is explained in greater detail below and is illustrated in the accompanying drawings, in which.

DETAILED DESCRIPTION OF THE PREFERRED EMBODIMENTS

Figure 1:
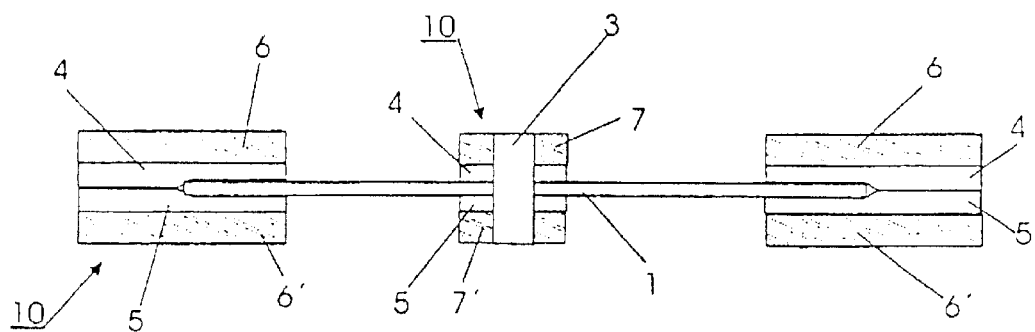
FIG. 1 is a sectional view of a membrane electrode unit as claimed by the invention realized on the periphery and in the center with a reinforcing frame.
Figure 2:
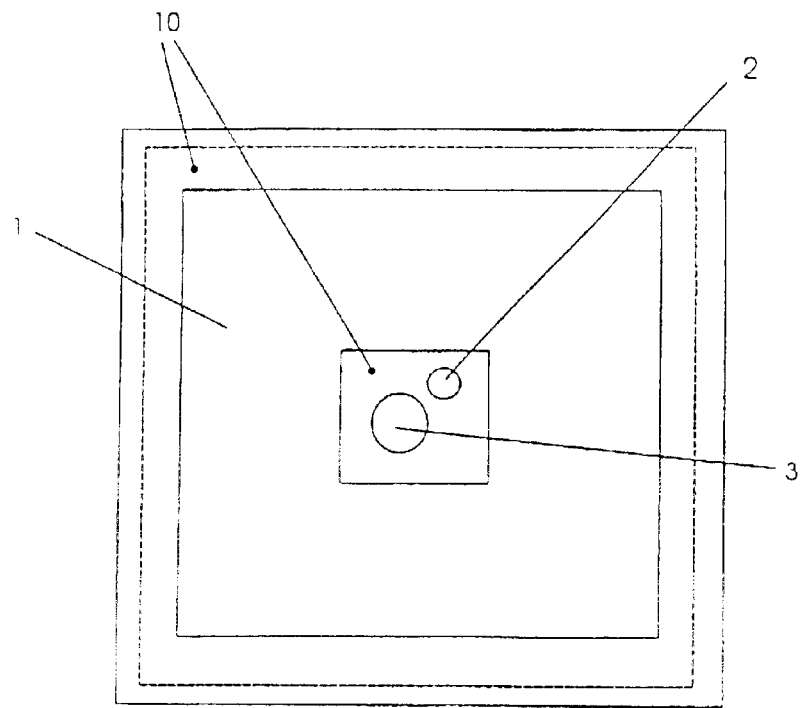
FIG. 2 is a plan view of the membrane electrode unit reinforced as illustrated in FIG. 1.

FIGS. 1 and 2 show a membrane electrode unit 1 which consists of a polymer electrolyte membrane and a porous catalyst layer deposited on it on both sides and attached to a backing material made of carbon to form the anode and the cathode, and which is provided with a hot-melt-type adhesive layer 4, 5 on both sides in its outer peripheral area and in the vicinity of openings 2, 3 for the transport of media or installation. The hot-melt-type adhesive layers 4, 5 on the peripheral edge of the membrane electrode unit 1 project beyond the outer edge by up to approximately one-half of their width and in this projecting area are connected to each other so that they form a one-piece structure. On each of the hot-melt-type adhesive layers, for reinforcement, there is a respective rigid plate 6, 6' and 7, 7', which are made of plastic or a material that contains plastic and can also be fiber-reinforced. For the fabrication of the reinforced membrane-electrode unit 1, after cutting to size, the peripheral areas in question are coated with a hot-melt-type adhesive and the rigid plates 6, 6' and 7, 7' are applied, and under the effect of heat and pressure, an intimate bond is created between the projecting hot-melt-type adhesive layers and between the hot-melt-type adhesive and the membrane electrode unit 1 or the rigid plates 6, 6' and 7, 7', whereby during the hot pressing, the hot-melt-type adhesive evens out any differences in thickness and irregularities that may be present and penetrates deep into the pores that are present in the membrane electrode unit and in the rigid plates 6, 6' and 7, 7' and melts the two exposed, projecting layers of hot-melt-type adhesive together to form a single homogeneous unit. The membrane electrode unit 1 therefore has, on the outer edge and optionally in the vicinity of its active surface area, openings 2, 3 which are provided for guiding material and for installation by means of one or more reinforcing frames 10 which ensure easy handling during installation and guarantee a secure seal on the edge and on the periphery of the openings. The total surface area of the membrane electrode unit 1 can be kept relatively small. The reinforced unit consists of only a few components and the fabrication process is very simple.

Figure 3:
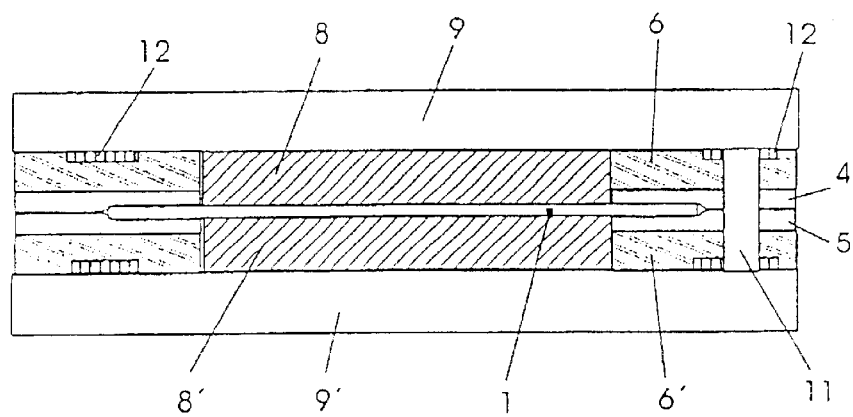
FIG. 3 is a sectional view of a membrane electrode unit as claimed by the invention with an opening for media transport in the reinforcing frame realized on the periphery and a gas transport structure and current leads connected flush to the reinforcing frame.

FIG. 3 shows the reinforced membrane electrode unit 1 in connection with gas distributors 8 and current leads 9 (or bipolar plates). In the reinforcing frame 10 there is an opening 11 to guide material. The reinforcing frame is sealed against the current lead 9 by an additional seal 12. In this case, the seal 12 is recessed into the rigid plate 6, 6', although it can also extend over the entire surface of the plates 6, 6'.

Figure 4:
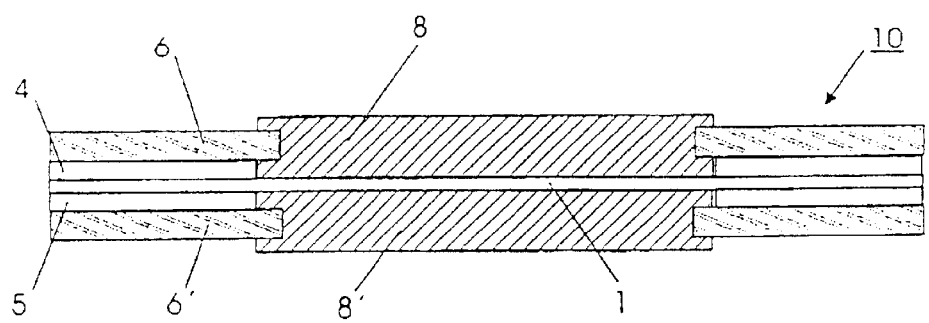
FIG. 4 is a sectional view of a membrane electrode unit in which the reinforcing frame is connected with the gas distributor.

FIG. 4 illustrates an additional exemplary embodiment of the invention, in which the rigid plates 6, 6' are recessed into the end surface of the gas distributors 8, 8', to hold them in place and thereby form a compact cell that is easy to handle. In this variant, the reinforcing frame 10 is connected over its entire surface with the edge of the membrane electrode unit 1.

The polymers used for the membrane electrode unit 1 have a low surface energy, which means that on account of the resulting poor adhesive connection that can be achieved with conventional adhesives, it is difficult to establish a stable connection with the reinforcing frame 10. Moreover, the softening temperature cannot be very high, to avoid damaging the membrane material when it is exposed to temperatures that are too high. Therefore a hot-melt-type adhesive with ionic or strong polar groups is used which enters into a surface interaction with the ionic groups of the polymer electrolyte membrane and guarantees high adhesion forces. The melting point of the hot-melt-type adhesive is preferably between 80 and 140° C., so that the polymer electrolyte membrane remains undamaged when the reinforcing frame melts. On the other hand, the softening temperature of the hot-melt-type adhesive is not exceeded during the operation of the fuel cell. In this case, hot-melt-type adhesives with carboxylic acid groups, their salts or polar derivatives of carboxylic acid are used, which can be produced by copolymerization of a momomer with these materials, for example.

What is claimed is:

1. A membrane electrode unit for fuel cells, membrane electrolysis units and membrane compressors comprising a polymer electrolyte membrane and electrodes that cover said membrane on both sides and a reinforcing frame that is attached to the periphery of the membrane electrode unit, wherein the reinforcing frame is formed by a hot-melt-type adhesive layer that is deposited on one or both sides in the outer peripheral area and/or in the peripheral area of openings that are provided for installation and/or to guide media, and a rigid plate which is attached to the hot-melt-type adhesive layer, whereby the hot-melt-type adhesive layers can be connected by the action of pressure and heat with the rigid plate(s) and with the membrane electrode unit to form a one-piece reinforcing segment in said peripheral area.

2. The membrane electrode unit as claimed in claim 1, wherein the hot-melt-type adhesive layers extend beyond the outer edge on the outer periphery of the membrane electrode unit, and the projecting surfaces facing each other in this area are melted together to form a homogeneous, one-piece hot-melt-type adhesive layer.

3. The membrane electrode unit as claimed in claim 1, wherein the hot-melt-type adhesive layers are made of a hot-melt-type adhesive that preferably melts in the temperature range between 80 and 140° C. with ionic or strong polar groups that enter into a surface interaction with the ionic groups of the polymer electrolyte membrane.

4. The membrane electrode unit as claimed in claim 3, wherein the hot-melt-type adhesive is provided with groups of carboxylic acid or its salts or polar derivatives of carboxylic acid introduced into it by copolymerization.

5. The membrane electrode unit as claimed in claim 1, wherein gas distributors are inserted into the space that is encircled by the reinforcing frame(s).

6. The membrane electrode unit as claimed in claim 5, wherein the rigid plates are recessed on the end into the gas distributors.

7. The membrane electrode unit as claimed in claim 1, wherein current leads or bipolar plates are located on both sides, whereby between the latter and the reinforcing frame there is a seal on at least one side.

8. The membrane electrode unit as claimed in claim 1, wherein the rigid plates are made of plastic or a material that contains plastic, which can also be fiber-reinforced.

9. The membrane electrode unit as claimed in claim 1, wherein in the outer reinforcing frame in the area that projects beyond the outer edge of the membrane, there are openings for installation and/or to guide media.

* * * * *